United States Patent
Maisenbacher

(10) Patent No.: US 9,661,399 B2
(45) Date of Patent: May 23, 2017

(54) METHODS AND APPARATUS FOR PRESENTING A STILL-IMAGE FEEDBACK RESPONSE TO USER COMMAND FOR REMOTE AUDIO/VIDEO CONTENT VIEWING

(71) Applicant: SLING MEDIA INC., Foster City, CA (US)

(72) Inventor: Mark Kikuya Maisenbacher, Palo Alto, CA (US)

(73) Assignee: Sling Media, Inc., Foster City, CA (US)

( * ) Notice: Subject to any disclaimer, the term of this patent is extended or adjusted under 35 U.S.C. 154(b) by 0 days.

(21) Appl. No.: 14/936,238

(22) Filed: Nov. 9, 2015

(65) Prior Publication Data

US 2016/0192035 A1    Jun. 30, 2016

Related U.S. Application Data

(60) Provisional application No. 62/097,436, filed on Dec. 29, 2014.

(51) Int. Cl.
| | |
|---|---|
| H04N 21/81 | (2011.01) |
| H04N 21/438 | (2011.01) |
| H04N 5/44 | (2011.01) |
| H04N 21/2385 | (2011.01) |
| H04N 21/262 | (2011.01) |

(Continued)

(52) U.S. Cl.
CPC ....... *H04N 21/8153* (2013.01); *H04N 5/4403* (2013.01); *H04N 5/445* (2013.01); *H04N 5/775* (2013.01); *H04N 21/2385* (2013.01); *H04N 21/26216* (2013.01); *H04N 21/438* (2013.01)

(58) Field of Classification Search
USPC ..................... 725/93; 386/200, 297
See application file for complete search history.

(56) References Cited

U.S. PATENT DOCUMENTS

| | | | |
|---|---|---|---|
| 2004/0205816 A1* | 10/2004 | Barrett | H04N 5/76 725/49 |
| 2008/0022350 A1* | 1/2008 | Hostyn | H04L 29/06027 725/139 |

(Continued)

OTHER PUBLICATIONS

John Markoff, 2 Makers Plan Introductions of Digital VCR, Mar. 29, 1999, The New York Times, Business Day, http://www.nytimes.com/1999/03/29/business/2-makers-plan-introductions-of-digital-vcr.html?rref=collection%2Ftimestopic%FTiVo%20Inc.&action=click&contentCollection=business&region=stream&module=stream_unit&version=latest&contentPlacement=130.*

(Continued)

*Primary Examiner* — Hoang-Vu A Nguyen-Ba

(74) *Attorney, Agent, or Firm* — LK Global

(57) ABSTRACT

A method for presenting feedback to a user when a command is received is provided. The method receives, at a content retransmitter, a command for navigating audio/video content selections for retransmission to a user device; transmits the received command to a set-top box for execution, wherein execution of the command at the set-top box produces a result; while gradually receiving the result at the content retransmitter, creates a period of latency when the result is only partially available for retransmission; during the period of latency, retrieves a still-image frame associated with execution of the command; and transmits the still-image frame to the user device for presentation until the result is completely available for retransmission.

19 Claims, 3 Drawing Sheets

(51) Int. Cl.
*H04N 5/775* (2006.01)
*H04N 5/445* (2011.01)

(56) References Cited

U.S. PATENT DOCUMENTS

| | | | | |
|---|---|---|---|---|
| 2008/0244646 | A1* | 10/2008 | Son | H04B 1/202 725/38 |
| 2009/0320068 | A1* | 12/2009 | Chen | H04N 5/44591 725/39 |
| 2010/0129050 | A1* | 5/2010 | Alexander | H04N 21/23106 386/343 |
| 2011/0131618 | A1* | 6/2011 | Hasek | H04N 7/17336 725/89 |
| 2012/0159554 | A1* | 6/2012 | Bennett | H04N 7/165 725/56 |
| 2012/0266188 | A1* | 10/2012 | Ryu | H04N 21/42204 725/25 |
| 2014/0013356 | A1* | 1/2014 | Chen | H04N 21/482 725/40 |

OTHER PUBLICATIONS

Tivo, FAQ—Tivo, Jun. 24, 21013, https://www.tivo.com/content/faq FAQ_TiVo_Jun. 24, 2013.*
Anthony, Introducing Roku TV, Jan. 5, 2014, Official Roku Blog, https:/ /blog.roku.com/blog/2014/01/05/introducing-roku-tv/ Introducing Roku TV—The Official Roku Blog_Jan. 5, 2014.*

* cited by examiner

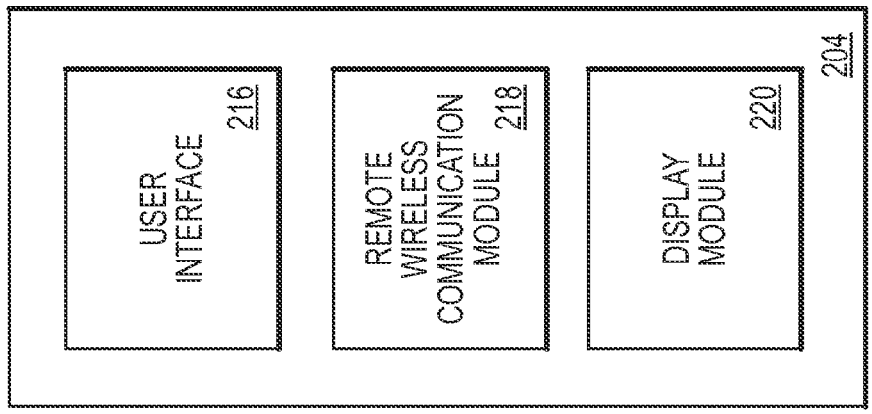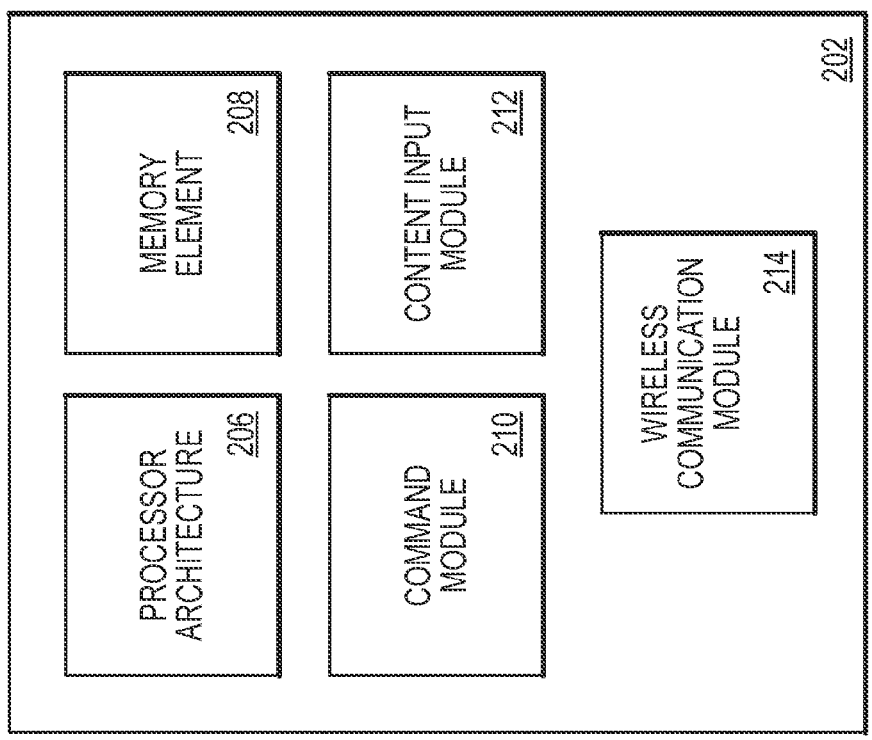
FIG. 2

METHODS AND APPARATUS FOR PRESENTING A STILL-IMAGE FEEDBACK RESPONSE TO USER COMMAND FOR REMOTE AUDIO/VIDEO CONTENT VIEWING

CROSS-REFERENCE TO RELATED APPLICATION(S)

This application claims the benefit of U.S. provisional patent application Ser. No. 62/097,436, filed Dec. 29, 2014.

TECHNICAL FIELD

Embodiments of the subject matter described herein relate generally to providing feedback to a command associated with viewing audio/video content. More particularly, embodiments of the subject matter relate to presenting a timely response to a user-entered command to execute functionality associated with remote viewing of audio/video content.

BACKGROUND

Most television viewers now receive video signals through a content aggregator such as a cable or satellite television provider, or internet-based programming provider. Digital video broadcasting (DVB) systems, such as satellite systems, are generally known. A DVB system that delivers video service to a home will usually include a video services receiver, system, or device, such as a set-top box (STB), smart-TV, or streaming media receiver compatible with a television connection (such as a USB "stick"). These types of programming receivers may receive network television broadcasts, cable and/or satellite television broadcasts, on-demand programming, internet-based programming accessible via specialized software applications, or the like. In a typical instance, encoded audio/video signals are sent via cable, wireless data link, or other internet-based communication technique, where the signals are decoded by the appropriate video services receiver. The decoded signals can then be viewed on a television or other appropriate display as desired by the viewer.

Audio/video content retransmission techniques enable a subscriber of a video service to view programming content on a device that is remotely located, relative to the incoming source of video. A content retransmission device receives a source video stream, encodes the stream for transport over a network (such as the internet), and sends the encoded video data to the user's remote device. Retransmitted audio/video content can be presented on a variety of user devices, such as a laptop computer, a mobile phone, a tablet computer, or the like.

However, the process of content retransmission experiences a period of latency as user requests must be transmitted multiple times to reach the video services receiver where such requests are executed. Additionally, video buffering techniques used by a content retransmitter introduce additional latency in receiving requested audio/video data.

Accordingly, it is desirable to provide a more timely response for the user once a command has been executed. In addition, it is desirable to provide a user some type of feedback to indicate that an audio/video content viewing system is ready to receive another user command. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for presenting feedback to a user when a command is received. The method receives, at a content retransmitter, a command for navigating audio/video content selections for retransmission to a user device; transmits the received command to a set-top box for execution, wherein execution of the command at the set-top box produces a result; while gradually receiving the result at the content retransmitter, creates a period of latency when the result is only partially available for retransmission; during the period of latency, retrieves a still-image frame associated with execution of the command; and transmits the still-image frame to the user device for presentation until the result is completely available for retransmission.

Some embodiments of the present disclosure provide a system for presenting feedback to a user when a command is received. The system includes: an audio/video content viewing device, configured to: receive audio/video content from a content retransmitter; present the audio/video content for viewing; receive user commands to navigate menu selections; and transmit the received user commands to the content retransmitter; the content retransmitter, configured to transmit audio/video content to the audio/video content viewing device, wherein the content retransmitter is further configured to: receive a first user command, via the audio/video content viewing device, to navigate a viewing selection for the audio/video content; execute the first user command to request the audio/video content; gradually receive the audio/video content, creating a period of latency when the audio/video content has been partially received; during the period of latency, retrieve a still-image frame associated with execution of the command; and transmit the still-image frame to the audio/video content viewing device.

Some embodiments of the present disclosure provide a system for presenting feedback to a user when a command is received. The system includes: a user interface, configured to receive user input to navigate audio/video content menu selections, and to present audio/video content and still-image feedback via a display element; a processor architecture communicatively coupled to the user interface, wherein the processor architecture comprises: a command module, configured to interpret the received user input to determine a menu command associated with the user input, and to transmit the menu command to a video services receiver for execution; a content input module, configured to: gradually receive the audio/video content from a video services receiver, in response to the transmitted menu command, wherein the gradual receiving of the audio/video content creates a period of latency; during the period of latency, retrieve still-image feedback associated with the menu command; and a communication module, configured to transmit the still-image feedback to the user interface for presentation until the audio/video content is available for transmission to the user interface.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a schematic block diagram representation of a feedback response system, according to some embodiments.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods used to present still-image feedback to a viewer of audio/video content via a content retransmitter, in response to a command received from the viewer to present new audio/video content or to alter the audio/video content currently being viewed. A viewer command may include instructions to change the channel, to select a recorded program, to access a menu, or any other command relating to functionality associated with a set-top box that is in communication with the content retransmitter. A still-image frame is presented to the viewer, in response to receiving the command, to provide feedback to the user during a period of interruption of the content retransmission due to latency.

Figure 1:
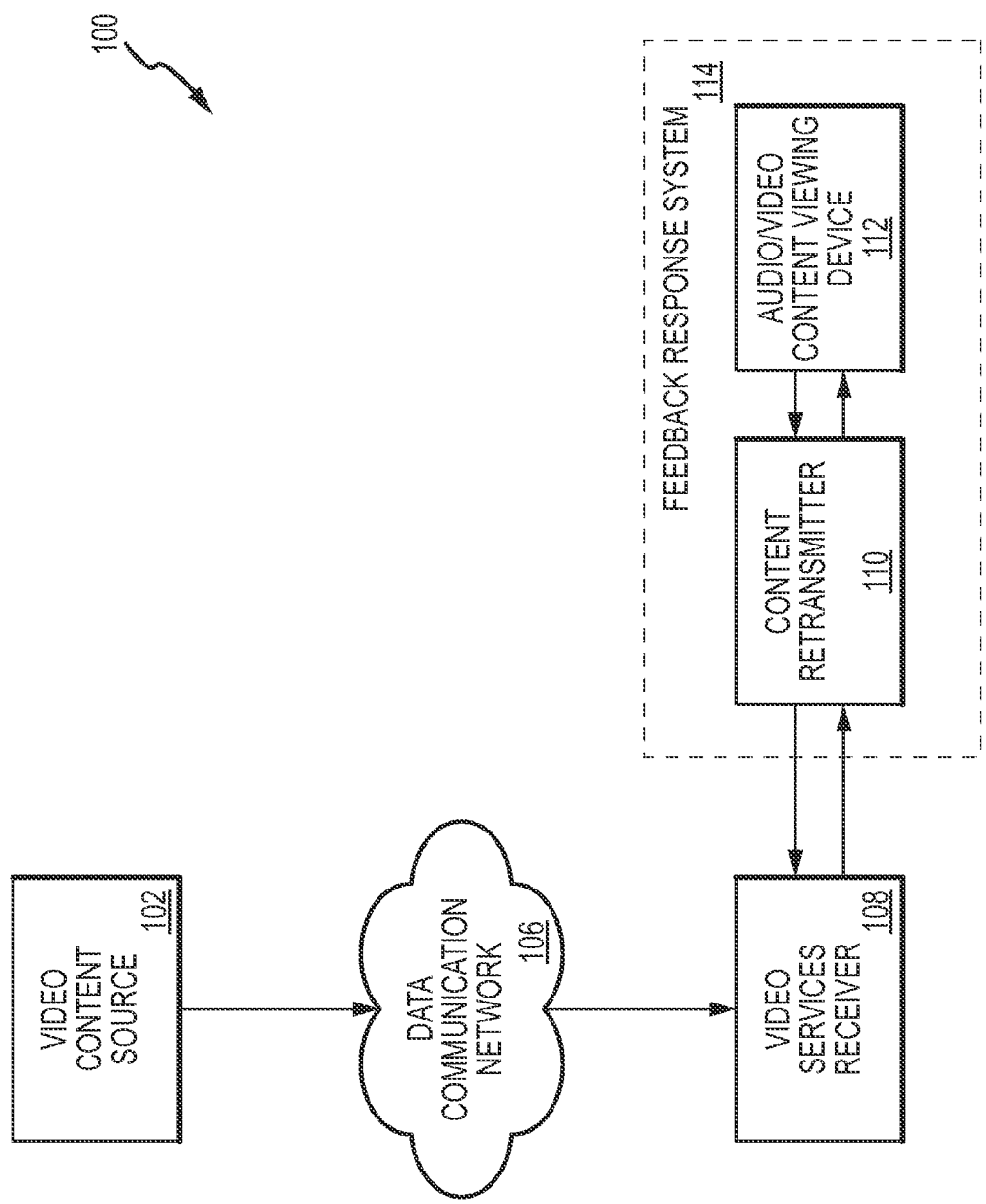
FIG. 1 is a schematic representation of an embodiment of a system for remote viewing of audio/video content.

Turning now to the figures, FIG. 1 is a schematic representation of an embodiment of a video services system 100 that is configured for remote viewing of audio/video content. The video services system 100 is further configured to support the techniques for providing still-image feedback to a remote viewer, as described in more detail herein. The video services system 100 (which has been simplified for purposes of illustration) generally includes, without limitation: at least one video content source 102, a data communication network 106, at least one video services receiver 108, a content retransmitter 110, and an audio/video content viewing device 112. The content retransmitter 110 and the audio/video content viewing device 112, as shown, perform functionality associated with a feedback response system 114. Although FIG. 1 only depicts one video services receiver 108 (and an accompanying feedback response system 114), it should be appreciated that the video services system 100 may support any number of video services receivers 108 and feedback response systems 114.

The video services system 100 may utilize any data communication methodology, including, without limitation: satellite-based data delivery, cable-based data delivery, cellular-based data delivery, web-based data delivery, or a combination thereof. In this regard, the system 100 may include or utilize a data communication network 106, as depicted in FIG. 1. The specific details of such delivery systems and related data communication protocols will not be described here. In practice, the data communication network 106 may be any digital or other communications network capable of transmitting messages or data between devices, systems, or components. In certain embodiments, the data communication network 106 includes a packet switched network that facilitates packet-based data communication, addressing, and data routing. The packet switched network could be, for example, a wide area network, the Internet, or the like. In various embodiments, the data communication network 106 includes any number of public or private data connections, links or network connections supporting any number of communications protocols. The data communication network 106 may include the Internet, for example, or any other network based upon TCP/IP or other conventional protocols. In various embodiments, the data communication network 106 could also incorporate a wireless and/or wired telephone network, such as a cellular communications network for communicating with mobile phones, personal digital assistants, and/or the like. The data communication network 106 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to video/media communication systems, video/media broadcasting systems, data transmission, signaling, network control, and other functional aspects of the systems (and the individual operating components of the systems) may not be described in detail herein.

The video content source 102 may communicate with the video services receiver 108 using an off-air video broadcast, cable television network, satellite television network, or the like. The video content source 102 provides media content (such as audio/video programming, advertising content, music programming, and other video or audiovisual content) to each connected video services receiver 108, which in turn provides output to the content retransmitter 110 as needed and/or requested.

A video services receiver 108 may be configured to record received video broadcast content, and may comprise Digital Video Recorder (DVR) technology. In certain embodiments, a video services receiver 108 may include or cooperate with a suitably configured presentation device (not pictured), such as a television set; a monitor; a computer display; a portable electronic device; or any suitable customer appliance with compatible display capabilities. In various embodiments, each video services receiver 108 is a conventional set-top box commonly used with satellite or cable television distribution systems. In other embodiments, however, the functionality of a video services receiver 108 may be commonly housed within a presentation device. In still other embodiments, a video services receiver 108 is a portable device that may be transportable with or without a presentation device. A video services receiver 108 may also be suitably configured to support broadcast television reception, video game playing, personal video recording, and/or other features as desired.

The content retransmitter 110 may be any component, hardware, software logic, or any combination thereof, which is capable of transmitting a packetized stream of media content over the data communication network 106. In various embodiments, the content retransmitter 110 incorporates suitable encoder and/or transcoder (collectively "encoder") logic to convert audio/video or other media content into a packetized format that can be transmitted over the data communication network 106. The transmitted audio/video content may be received in any format, and may be received from any internal or external video content source 102, such as any sort of broadcast source, a cable or satellite television programming source, a "video-on-demand" or similar source, a digital video disk (DVD) or other removable media, a video camera, and/or the like. The content retransmitter 110 encodes the transmitted audio/video content to create an encoded video stream in any manner. In various embodiments, the content retransmitter 110 contains a video buffer that temporarily stores encoded data prior to transmission over the data communication network 106.

In practice, an embodiment of the content retransmitter 110 may be implemented using any of the various SLING-BOX products available from Sling Media of Foster City, Calif., although other products could be used in other embodiments. Certain embodiments of the content retransmitter 110 are generally capable of receiving a stream of audio/video content from an external media source (i.e., video services receiver 108), such as any sort of digital video recorder (DVR), set-top box (STB), cable or satellite programming source, DVD player, or the like. In such embodiments, the content retransmitter 110 may additionally provide commands to the video services receiver 108 to produce a desired video stream or, in other words, to access a desired set of audio/video content. Such commands may be provided over any sort of wired or wireless interface, such as an infrared or other wireless transmitter that emulates remote control commands receivable by the video services receiver 108. Other embodiments, however, may modify or omit this feature entirely.

In certain embodiments, the content retransmitter 110 may be implemented as a physically distinct and remote device or system relative to the video services receiver 108. In other embodiments, however, the video services receiver 108 and the content retransmitter 110 may be implemented as a single hardware component or device. In some embodiments, the video services receiver 108, the content retransmitter 110, and the audio/video content viewing device 112 may be implemented as a single hardware component or device. Moreover, a physically distinct content retransmitter 110 may communicate with the video services receiver 108 and/or the audio/video content viewing device 112 directly or via the data communication network 106. Similarly, a physically distinct hardware component comprising a video services receiver 108 and a content retransmitter 110 may communicate with an audio/video content viewing device 112 directly or via the data communication network 106, if so desired.

In some embodiments, the functionality of the content retransmitter 110 may be integrated with any sort of content-receiving or other capabilities typically affiliated with the video services receiver 108. Accordingly, the content retransmitter 110 may be a hybrid set-top box or other receiver, for example, that also provides transcoding and content retransmission features. Such a device may receive satellite, cable, broadcast and/or other signals that encode television programming or other content received from an antenna, modem, server, and/or other source. A receiver of the content retransmitter 110 may further demodulate or otherwise decode the received signals to extract programming that can be locally viewed and/or retransmitted for remote-viewing via an audio/video content viewing device 112 as appropriate. In this regard, the content retransmitter 110 may also include a content database stored on a hard disk drive, memory, or other storage medium to support a personal or digital video recorder (DVR) feature or other content library as appropriate. Hence, in some embodiments, the video services receiver 108 and the content retransmitter 110 may be physically and/or logically contained within a common component, housing, or chassis.

In still other embodiments, the content retransmitter 110 includes or is implemented as a software program, applet, or the like, executing on a conventional computing system (e.g., a personal computer). In such embodiments, the content retransmitter 110 may encode, for example, some or all of a screen display typically provided to a user of the computing system for content retransmission to a remote location. One device capable of providing such functionality is the SlingProjector product available from Sling Media of Foster City, Calif., which executes on a conventional personal computer, although other products could be used as well.

During typical operation, the content retransmitter 110 receives media content (i.e., audio/video content or broadcast programming), and reformats particular subsets of the received media content for retransmission to compatible devices (e.g., the audio/video content viewing device 112) when requested by a user. Such subsets may include television programs, movies, video clips, and other time-limited forms of media content which may be requested by the user. The content retransmitter 110 is configured to then transmit the reformatted media content to the audio/video content viewing device 112.

The audio/video content viewing device 112 may be any device, component, module, hardware, software, or any combination thereof, which is capable of receiving the encoded audio/video content from one or more content retransmitters 110. The audio/video content viewing device 112 is generally used for remote viewing of media content provided by the video content source 102 and made available to a user via the combined capabilities of the video services receiver 108 and the content retransmitter 110. The content retransmitter 110 is used for the personal "rebroadcast" of this media content, without requiring the user (or the user's media content display devices) to be present at the same physical location as the video services receiver 108. To facilitate remote viewing, the audio/video content viewing device 112 may be implemented as a personal computing and/or multimedia device (e.g., a desktop computer, a laptop computer, handheld computing device, personal media device, tablet computer, personal digital assistant (PDA), smartphone, smartwatch, or the like) which utilizes the data communication network 106. In many embodiments, the audio/video content viewing device 112 is a general purpose computing device that includes a media player application in software or firmware that is capable of securely connecting to the content retransmitter 110, and is capable of receiving and presenting media content to the user of the device as appropriate. In other embodiments, however, the audio/video content viewing device 112 is a standalone or other separate hardware device capable of receiving the encoded stream of audio/video content via any portion of the data communication network 106 and decoding the encoded stream of audio/video content to provide an output signal that is presented on a display element.

The feedback response system 114 (which includes the content retransmitter 110 and the audio/video content viewing device 112) retrieves and presents still-image feedback for a remote viewer of rebroadcast media content, based on received user commands, as described in more detail below. The still-image feedback is retrieved by the feedback response system 114 from the media content provided by the video services receiver 108, and the still-image feedback is presented by the audio/video content viewing device 112, until the requested streaming audio/video content is available for viewing.

FIG. 2 is a schematic block diagram representation of a feedback response system 200, according to some embodiments. A feedback response system 200 operates cooperatively with a video services receiver (as shown in FIG. 1), and is generally implemented using a content retransmitter 202 and an audio/video content viewing device 204, as described above with regard to FIG. 1.

The illustrated embodiment of the audio/video content viewing device 204 includes, without limitation: a user interface 216, a remote wireless communication module 218, and a display module 220. The elements and features of the content retransmitter 202 and the audio/video content viewing device 204, as shown, may be operatively associated with one another, coupled to one another, or otherwise configured to cooperate with one another as needed to support the desired functionality—in particular, providing a still-image feedback response during a period of latency, as described herein. For ease of illustration and clarity, the various physical, electrical, and logical couplings and interconnections for these elements and features are not depicted in FIG. 2. Moreover, it should be appreciated that embodiments of the content retransmitter 202 and/or the audio/video content viewing device 204 will include other elements, modules, and features that cooperate to support the desired functionality. For simplicity, FIG. 2 only depicts certain elements that relate to the still-image feedback response techniques described in more detail below.

The user interface 216 may include or cooperate with various features to allow a user to interact with the content retransmitter 202. Accordingly, the user interface 216 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, provide input, or otherwise control the operation of the audio/video content viewing device 204. Moreover, the user interface 216 may cooperate with the display module 220 to provide a graphical user interface (GUI). In other words, the user interface 216 could be implemented as a GUI, comprising graphical elements for receiving user input, rendered on a display of the audio/video content viewing device 204. In certain embodiments, the audio/video content viewing device 204 implements touch-sensitive technology for purposes of the user interface 216. Thus, a user can manipulate the user interface 216 by moving a cursor symbol rendered on the audio/video content viewing device 204, or by physically interacting with a display element itself for recognition and interpretation by the audio/video content viewing device 204. Using input keyboard commands and/or touch-screen commands (among other types of input commands), the user could manipulate the user interface 216 to navigate and make audio/video content selections (e.g., broadcast, recorded, or on-demand programming selections) and/or to access menus, scroll through an accessed menu, or to make menu selections associated with operations of a video services receiver, as described in more detail below.

The remote wireless communication module 218 transmits and receives wireless communication signals with an associated wireless communication module 214 of the content retransmitter 202. The remote wireless communication module 218, and the associated wireless communication module 214, may be implemented using any type of transceiver capable of transmitting and receiving data using wireless communication signals. For purposes of data transmission, the remote wireless communication module 218 and the wireless communication module 214 utilize a common communication protocol and are equipped with compatible communication hardware. In various embodiments, the remote wireless communication module 218 and the wireless communication module 214 utilize a wireless and/or wired telephone network to transmit and receive data, such as a cellular communications network for communicating with mobile phones, personal digital assistants, and/or the like. In some embodiments, the remote wireless communication module 218 and the wireless communication module 214 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

The remote wireless communication module 218 is configured to transmit user commands, selections, and requests (received via the user interface 216) to the content retransmitter 202 for further action. The remote wireless communication module 218 is further configured to receive streaming audio/video content, user-interactive menus, and still-image frames and screen-captures, for presentation via a display element of the audio/video content viewing device 204.

The display module 220 is configured to cooperate with a display element of the audio/video content viewing device 204 to present audio/video content and still-image feedback for viewing by a user. The presented audio/video content and still-image feedback are received by the remote wireless communication module 218, in response to selection input entered at the user interface 216. For example, when a user enters commands (at the user interface 216) to change the channel or to select another set of programming for viewing, the remote wireless communication module 218 is configured to transmit those user requests to the content retransmitter 202, and to receive the newly-selected set of programming and an applicable still-image frame to be used for feedback purposes. The display module 220 is configured to first present the still-image frame, as a feedback response for a user, until the newly-selected set of programming is available for continuous presentation with little to no latency.

The illustrated embodiment of the content retransmitter 202 generally includes, without limitation: a processor architecture 206, a memory element 208, a command module 210, a content input module 212, and a wireless communication module 214. The processor architecture 206 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 206 may be realized as one or more microprocessors, controllers, microcontrollers, or state machines. Moreover, the processor architecture 206 may be implemented as a combination of computing devices, e.g., a combination of digital signal processors and microprocessors, a plurality of microprocessors, one or more microprocessors in conjunction with a digital signal processor core, or any other such configuration.

The memory element 208 may be realized using any number of devices, components, or modules, as appropriate to the embodiment. Moreover, the content retransmitter 202 could include a memory element 208 integrated therein and/or a memory element 208 operatively coupled thereto, as appropriate to the particular embodiment. In practice, the memory element 208 could be realized as RAM memory, flash memory, EPROM memory, EEPROM memory, registers, a hard disk, a removable disk, or any other form of storage medium known in the art. In certain embodiments, the memory element 208 includes a hard disk, which may also be used to support functions of the content retransmitter 202. The memory element 208 can be coupled to the processor architecture 206 such that the processor architecture 206 can read information from, and write information to, the memory element 208. In the alternative, the memory element 208 may be integral to the processor architecture 206. As an example, the processor architecture 206 and the memory element 208 may reside in a suitably designed ASIC.

The command module 210 is suitably configured to interpret user input received via the wireless communication module 214, and to determine a menu command associated with the user input. The command module 210 is further configured to transmit the determined menu command to a video services receiver (see FIG. 1, reference 108) for execution. User commands may include, without limitation: instructions to change broadcast programming channels viewable using a video services receiver, select menus associated with audio/video content available via a video services receiver, and make audio/video content selections from video services receiver menus (e.g., channel selection menus, on-demand programming menus, recorded programming lists, etc.).

The content input module 212 is configured to receive audio/video content from a video services receiver, and to retrieve still-image feedback in response to execution of the menu command by the video services receiver. Generally, received audio/video content is a stream of media content, which may include broadcast television programming, broadcast internet programming, on-demand programming, recorded programming, or the like. Audio/video content may be selected from a plurality of channels, menus, lists, software applications ("apps"), or sub-groups, which may access such programming using television network broadcasts, internet programming websites and/or recorded programming menus (e.g., DVR menus), or the like.

The content input module 212 retrieves an applicable still-image frame from a communicatively coupled video services receiver (see FIG. 1, reference 108), when a user command is received via the wireless communication module 214. An applicable still-image video frame may include a single video frame from a newly-selected video stream or a screen-capture of a user-accessed selection menu. User commands may indicate a requested change to a programming channel currently being viewed, an instruction to access a menu, a set of recorded media content, or a set of on-demand content. The content input module 212 obtains access to the stream of audio/video content, as it is gradually provided by a video services receiver, as described above, and in certain embodiments, is configured to retrieve a still-image frame, which accurately reflects the selection of the user, from this content stream.

Latency is introduced into the feedback response system 200 due to the time required for an input user command to be transmitted from the user interface 216 to a communicatively-coupled video services receiver (e.g., a set-top box), the time required for execution of the input user command at the video services receiver, the time required for the output of the video services receiver to change to reflect the newly-requested content, the time required for the content input module 212 to access the newly-requested content, and the time required to transmit the newly-requested content to the audio/video content viewing device 204 for viewing by a user. Further, when the user command requests a second set of audio/video content for viewing in place of a first set of audio/video content currently being viewed, additional latency is introduced due to the time required to empty a video content buffer of the first set of audio/video content, and to re-fill the video content buffer with the newly-requested set of audio/video content. The requested set of audio/video content becomes available for viewing once the buffer has been refilled. Due to this latency (and the resultant appearance of non-responsiveness to the user command), the content input module 212 is configured to retrieve, and the wireless communication module 214 is configured to transmit for display, a single still-image video frame or screen-capture, prior to availability of the newly-requested content for transmission and display.

In practice, the command module 210 and/or the content input module 212 may be implemented with (or cooperate with) the processor architecture 206 to perform at least some of the functions and operations described in more detail herein. In this regard, the command module 210 and/or the content input module 212 may be realized as suitably written processing logic, application program code, or the like.

Figure 3:
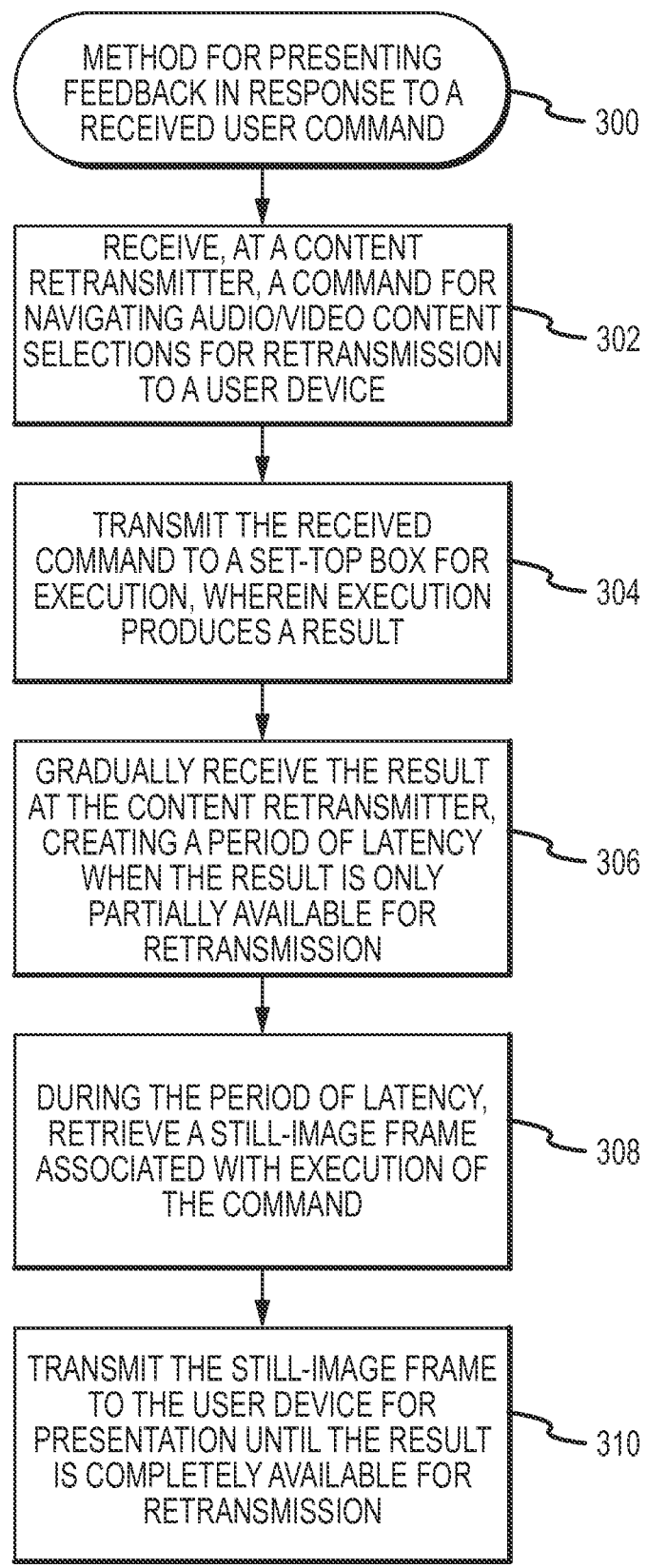
FIG. 3 is a flow chart that illustrates an embodiment of a process for presenting feedback in response to a received user command.

FIG. 3 is a flow chart that illustrates an embodiment of a process 300 for presenting feedback in response to a received user command. The various tasks performed in connection with process 300 may be performed by software, hardware, firmware, or any combination thereof. For illustrative purposes, the following description of process 300 may refer to elements mentioned above in connection with FIGS. 1-2. In practice, portions of process 300 may be performed by different elements of the described system, e.g., a video services receiver, a content retransmitter, or an audio/video content viewing device. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

For ease of illustration and clarity, process 300 begins by receiving, at a content retransmitter, a command for navigating audio/video content selections for retransmission to a user device (step 302). The user command may include, without limitation: a request to access a particular menu on the set-top box; an instruction to access a set of recorded programming on the set-top box (e.g., DVR functionality associated with the set-top box); an instruction to change a channel associated with a particular television broadcast network; an instruction to access a particular software application associated with internet-based programming at the set-top box; or any other instruction capable of execution at the set-top box.

Generally, the content retransmitter receives a command via remote control or other user interface, such as a combination of graphical elements (e.g., a graphical user interface (GUI)). In one example, a user is viewing a first set of audio/video content that has been "retransmitted" from a set-top box or video services receiver to a user device. The user then selects a second set of audio/video content for viewing by submitting a command to the content retransmitter. In certain embodiments, the user may submit this command using a remote control (e.g., an infrared remote control, a radio-signal remote control, a Bluetooth remote control, or a remote control using any other form of communication protocol). In some embodiments, the user may submit this command using another type of user interface in communication with the content retransmitter. In other embodiments, the user may submit this command using a hardware or software interface (such as a touchpad or GUI) of the same user device being used to view the first set of audio/video content.

Next, the process 300 transmits the received command to a set-top box for execution, wherein execution of the command produces a result (step 304). When a user is viewing the set of audio/video content at a user device in communication with the content retransmitter, the content retransmitter is simply re-directing audio/video content obtained through set-top box. The set-top box itself receives audio/video content from a content source, such as a cable, satellite, or internet-based programming source. Here, when the user decides to make another selection (e.g., to change the channel or access a menu) at the user device, the user device communicates the selection to the content retransmitter, which further transmits the command to the set-top box providing the programming. Execution of the command occurs at the set-top box, altering the output of the set-top box, and thus altering the audio/video content accessible by the content retransmitter. The produced result includes the altered output signal.

Once the command has been transmitted to the set-top box, the process 300 gradually receives the result at the content retransmitter, creating a period of latency when the result is only partially available for retransmission (step 306). Here, the result produced by the set-top box includes a stream of audio/video content requested by the user, which is received at the content retransmitter in a gradual manner. For example, the size of a stream of audio/video content comprising a television show is too large to transmit or receive all at once. As another example, a user may have selected to view continuously streaming content from a particular channel, without a defined time for ending transmission of the channel's content. For both of these examples, a stream of audio/video content is transmitted in the form of a continuous stream of video frames (and associated audio content). This stream of content is received gradually, and fills up a buffer used by the content retransmitter to provide viewing that minimizes errors and periods of inactivity.

There is a period of latency between the time the user command is received by the content retransmitter and the time that the user is capable of viewing the results of the executed command at a user device. This latency reflects the time required for the user command to be transmitted from the content retransmitter to the set-top box, the time required for execution of the command at the set-top box, the time required for the output of the set-top box to change to reflect the newly-requested content, the time required for the content retransmitter to access the newly-requested content, and the time required to transmit the newly-requested content to the user device for viewing. Further, when the user command requests a second set of audio/video content for viewing in place of the first set of audio/video content currently being viewed, additional latency is introduced due to the time required to empty the buffer of the content retransmitter of the "old" audio/video content, and to re-fill the buffer of the content retransmitter with the newly-requested audio/video content. The requested set of audio/video content becomes available for viewing once the buffer has been refilled.

During the period of latency, the process 300 retrieves a still-image frame associated with execution of the command (step 308). Applicable still-image frames are directly associated with the particular user command. For example, when a user enters a request to access a set of recorded programming, the applicable still-image frame is retrieved from the selected set of recorded programming. As another example, when a user enters an instruction to change the channel currently being viewed, the applicable still-image frame may be retrieved from currently streaming content at the newly-requested channel. In another example, when a user enters an instruction to access a menu at the set-top box, the applicable still-image frame may include a screen-capture of the selected menu. Here, the process 300 retrieves a still-image frame reflecting the change due to the received user command. Because the still-image frame is a single screen-capture or video frame, and retrieval of the still-image frame does not require refilling of the video content buffer, the still-image frame is retrieved and available for viewing much more quickly than the requested set of audio/video content.

Using our previous example, when the user is viewing a first set of audio/video content and makes a selection to view a second set of audio/video content, the command to access the second set is received by the content retransmitter and forwarded to the set-top box, where transmission of the first set of audio/video content is discontinued and the second set of audio/video content is accessed and output to the content retransmitter. The content retransmitter begins receiving the second set of audio/video content, as the video content buffer refills, and transmits this content to the user device once refilling of the buffer is complete. Following receipt of this user command, and while the buffer is in the process of refilling, the process 300 extracts a still-image frame from the second set of audio/video content.

After retrieving the still-image frame associated with execution of the command (step 308), the process 300 transmits the still-image frame to the user device for presentation until the result is completely available for retransmission (step 310). The still-image frame replaces the currently-streaming audio/video content, and is presented as a rapid feedback response to the user, prior to availability of the newly-requested content for presentation at the user device.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium," "processor-readable medium," or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for presenting feedback to a user when a command is received, the method comprising:

receiving, at a content retransmitter, a command for navigating audio/video content selections for retransmission to a user device, wherein the content retransmitter comprises a component communicatively coupled to a set-top box and the user device, wherein the content retransmitter is configured to provide commands to the set-top box, receive a video stream from the set-top box, and transmit the video stream to the user device;

transmitting the received command to the set-top box for execution, wherein execution of the command by the set-top box produces a result, wherein the received command comprises at least one of a first selection of a selected set of recorded programming, a second selection of a set of currently streaming content, or a third selection of a selected menu;

gradually receiving the result at the content retransmitter, creating a period of latency when the result is only partially available for retransmission, wherein the result comprises the video stream, and wherein gradually receiving the result further comprises gradually filling a video buffer of the content retransmitter with the result produced by the set-top box;

during the period of latency, retrieving a still-image frame associated with execution of the command, wherein retrieving the still-image frame comprises retrieving at least one of a first frame from the selected set of recorded programming in the video buffer, a second frame from the set of currently streaming content in the video buffer, or a third frame comprising the screen-capture of a selected menu in the video buffer; and transmitting the still-image frame to the user device for presentation until the result is completely available for retransmission.

2. The method of claim 1, further comprising:

receiving, at the content retransmitter, a set of audio/video content from the set-top box;

transmitting the set of audio/video content to the user device for presentation; and discontinuing transmission of the set of audio/video content when the command has been received.

3. The method of claim 1, wherein the receiving step further comprises:

receiving, at the content retransmitter, an instruction to change a first channel configured to supply a first set of audio/video content to a second channel configured to supply a second set of audio/video content, for retransmission to the user device;

wherein the command comprises the instruction; and
wherein the still-image frame comprises a screen-capture from the second set of audio/video content.

4. The method of claim 1, wherein the receiving step further comprises:
receiving, at the content retransmitter, an instruction to replace a first set of audio/video content with a second set of audio/video content, for retransmission to the user device;
wherein the command comprises the instruction; and
wherein the still-image frame comprises a screen-capture from the second set of audio/video content.

5. The method of claim 1, wherein the receiving step further comprises:
receiving, at the content retransmitter, an instruction to access a selection menu for use via the user device;
wherein the command comprises the instruction; and
wherein the still-image frame comprises a screen-capture of the selection menu.

6. The method of claim 1, wherein the receiving step further comprises:
receiving, at the content retransmitter, an instruction to access a recorded set of audio/video content for retransmission to the user device;
wherein the command comprises the instruction; and
wherein the still-image frame comprises a screen-capture from the recorded set of audio/video content.

7. The method of claim 1, wherein the receiving step further comprises:
receiving, at the content retransmitter, an instruction to scroll within an accessed menu viewable via the user device;
wherein the command comprises the instruction; and
wherein the still-image frame comprises a screen-capture of the scrolling action.

8. A system for presenting feedback to a user when a command is received, the system comprising:
an audio/video content viewing device, configured to:
receive audio/video content from a content retransmitter;
present the audio/video content for viewing;
receive user commands to navigate menu selections; and
transmit the received user commands to the content retransmitter;
the content retransmitter, communicatively coupled to a set-top box and the audio/video content viewing device, wherein the content retransmitter is configured to provide commands to the set-top box, receive audio/video content from the set-top box, and transmit the audio/video content to the audio/video content viewing device, wherein the content retransmitter is further configured to:
receive a first user command, via the audio/video content viewing device, to navigate a viewing selection for the audio/video content;
transmit the first user command to a set-top box to request the audio/video content from the set-top box, wherein the received command comprises at least one of a first selection of a selected set of recorded programming, a second selection of a set of currently streaming content, or a third selection of a selected menu;
gradually receive the audio/video content, creating a period of latency when the audio/video content has been partially received, wherein gradually receiving the result further comprises gradually filling a video buffer of the content retransmitter with the result produced by the set-top box;
during the period of latency, retrieve a still-image frame associated with execution of the command, wherein retrieving the still-image frame comprises retrieving at least one of a first frame from the selected set of recorded programming in the video buffer, a second frame from the set of currently streaming content in the video buffer, or a third frame comprising the screen-capture of a selected menu in the video buffer; and
transmit the still-image frame to the audio/video content viewing device.

9. The system of claim 8, wherein the audio/video content viewing device is further configured to:
receive user input comprising user selections of viewing content and menu functions associated with the audio/video content, wherein the user input comprises at least the first user command;
transmit the received user input to the content retransmitter;
receive the still-image frame associated with execution of the command; and
replace the presented audio/video content with presentation of the still-image frame.

10. The system of claim 8, wherein the content retransmitter comprises a buffer for continuous transmission of the audio/video content;
wherein the content retransmitter is further configured to:
fill the buffer with the audio/video content during transmission of the audio/video content to the audio/video content viewing device; and
when the user command has been received,
empty the buffer; and
refill the buffer with a second set of audio/video content associated with the received user command.

11. The system of claim 8, wherein the audio/video content viewing device is further configured to:
present the still-image frame during refilling of the buffer; and
once the buffer is refilled, replace the still-image frame with presentation of the second set of audio/video content.

12. The system of claim 8, further comprising:
a set-top box, configured to:
receive audio/video content from a content source;
receive and execute one or more commands, from the content retransmitter, to navigate audio/video content selections;
gradually provide the audio/video content to the content retransmitter, in response to receiving the one or more commands; and
provide the still-image frame to the content retransmitter during the period of latency.

13. The system of claim 12, wherein the set-top box and the content retransmitter are implemented as one integrated hardware device.

14. The system of claim 12, wherein the set-top box is implemented as a first hardware device, and wherein the content retransmitter is implemented as a second hardware device.

15. The system of claim 12, wherein the set-top box, the content retransmitter, and the audio/video content viewing device are implemented as one integrated hardware device.

16. A system for presenting feedback to a user when a command is received, the system comprising:

system memory;

a user interface, configured to receive user input to navigate audio/video content menu selections, and to present audio/video content and still-image feedback via a display element;

a transceiver, configured to transmit one or more still-images to the user interface for presentation; and at least one processor communicatively coupled to the system memory, the user interface, and the transceiver, wherein the at least one processor is configured to:

interpret the received user input to determine a menu command associated with the user input transmit the menu command to a video services receiver for execution, wherein execution of the command by the video services receiver produces a result, and wherein the received command comprises at least one of a first selection of a selected set of recorded programming, a second selection of a set of currently streaming content, or a third selection of a selected menu;

gradually receive the audio/video content from a video services receiver, in response to the transmitted menu command, wherein the gradual receiving of the audio/video content creates a period of latency, wherein gradually receiving the result further comprises gradually filling a video buffer of the content retransmitter with the result produced by the video services receiver;

during the period of latency, retrieve still-image feedback associated with the menu command, wherein retrieving the still-image frame comprises retrieving at least one of a first frame from the selected set of recorded programming in the video buffer, a second frame from the set of currently streaming content in the video buffer, or a third frame comprising the screen-capture of a selected menu in the video buffer; and initiate transmission of the still-image feedback to the user interface, by the transceiver, for presentation until the audio/video content is available for transmission to the user interface.

17. The system of claim 16, wherein the menu command comprises an instruction to access a selection menu for a plurality of sets of audio/video content; and wherein the still-image feedback comprises a screen-capture of the selection menu.

18. The system of claim 16, wherein the menu command comprises an instruction to receive a second set of audio/video content; and wherein the still-image feedback comprises a screen-capture from the second set of audio/video content.

19. The system of claim 16, wherein the menu command comprises an instruction to access a recorded set of audio/video content; and wherein the still-image feedback comprises a screen-capture from the recorded set of audio/video content.

* * * * *